(12) United States Patent
Beverly et al.

(10) Patent No.: US 7,590,135 B2
(45) Date of Patent: Sep. 15, 2009

(54) METHODS AND APPARATUS TO PERFORM SECURITY RELATED OPERATIONS ON RECEIVED SIGNALS

(75) Inventors: Harlan T. Beverly, McDade, TX (US); Quang Le, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1197 days.

(21) Appl. No.: 10/334,894

(22) Filed: Dec. 30, 2002

(65) Prior Publication Data

US 2004/0187107 A1    Sep. 23, 2004

(51) Int. Cl.
*H04L 12/56* (2006.01)
*H04J 1/16* (2006.01)

(52) U.S. Cl. .................. 370/419; 370/386; 370/463

(58) Field of Classification Search .......... 370/419, 370/463, 465, 466, 469, 386, 150–152, 252, 370/429; 709/250, 203, 220–226; 725/125; 375/354; 713/153
See application file for complete search history.

(56) References Cited

U.S. PATENT DOCUMENTS

| | | | | |
|---|---|---|---|---|
| 5,282,203 | A * | 1/1994 | Oouchi | 370/232 |
| 6,675,211 | B1 * | 1/2004 | Mamaghani et al. | 709/224 |
| 6,959,007 | B1 * | 10/2005 | Vogel et al. | 370/469 |
| 2002/0162026 | A1 | 10/2002 | Neuman et al. | |
| 2002/0181633 | A1 * | 12/2002 | Trans | 375/354 |
| 2003/0061623 | A1 * | 3/2003 | Denney et al. | 725/125 |
| 2004/0071166 | A1 * | 4/2004 | Yen et al. | 370/472 |
| 2004/0139313 | A1 * | 7/2004 | Buer et al. | 713/150 |
| 2004/0143734 | A1 * | 7/2004 | Buer et al. | 713/153 |
| 2008/0253294 | A1 * | 10/2008 | Ripa et al. | 370/242 |

OTHER PUBLICATIONS

Bonenfant et al. "Optical Data Networking". IEEE. Mar. 2000. pp. 63-70.*
IEEE Standards 802.3ae™, IEEE Standard for Information technology—Telecommunications and information exchange between systems—Local and metropolitan area networks-Specific requirements Part 3: Carrier Sense Multiple Access with Collision Detection (CSMA/CD) Access Method and Physical Layer Specifications Amendment: Media Access Control (MAC) Parameters, Physical Layers, and Management Parameters for 10 Gb/s Operation Aug. 30, 2002.
IEEE Standard for Information technology—Telecommunications and information exchange between systems—Local and metropolitan area networks—Specific requirements Part 3: Carrier sense multiple access with collision detection (CSMA/CD) access method and physical layer specifications Mar. 8, 2002.
Text of Second Office Action, issued by the Chinese Patent Office, dated Mar. 3, 2006, Application No. 2003101243657, 5 pages.
CSMA/CS, Std. 802.3ae-2002, Copyright 2002 IEEE.
Office Action (in Chinese with English Translation) issued on Feb. 13, 2009. by State Intellectual Property Office, PR China, 16 pages.

* cited by examiner

*Primary Examiner*—John Pezzlo
(74) *Attorney, Agent, or Firm*—Caven & Aghevli LLC

(57) ABSTRACT

Methods and apparatus to perform security related operations on received signals are described. In one embodiment, a security device may perform security related operations on received signals and a logic (such as an Ethernet controller) may include an interface to provide communication with the security device. Other embodiments are also disclosed.

90 Claims, 7 Drawing Sheets

METHODS AND APPARATUS TO PERFORM SECURITY RELATED OPERATIONS ON RECEIVED SIGNALS

FIELD

The subject matter disclosed herein generally relates to techniques to interconnect microchips.

DESCRIPTION OF RELATED ART

Design of physical implementations of computer systems in some cases takes into consideration the number of pins available to interconnect computer devices.

BRIEF DESCRIPTION OF THE DRAWINGS

Note that use of the same reference numbers in different Figures indicates the same or like elements.

DETAILED DESCRIPTION

Figure 1:
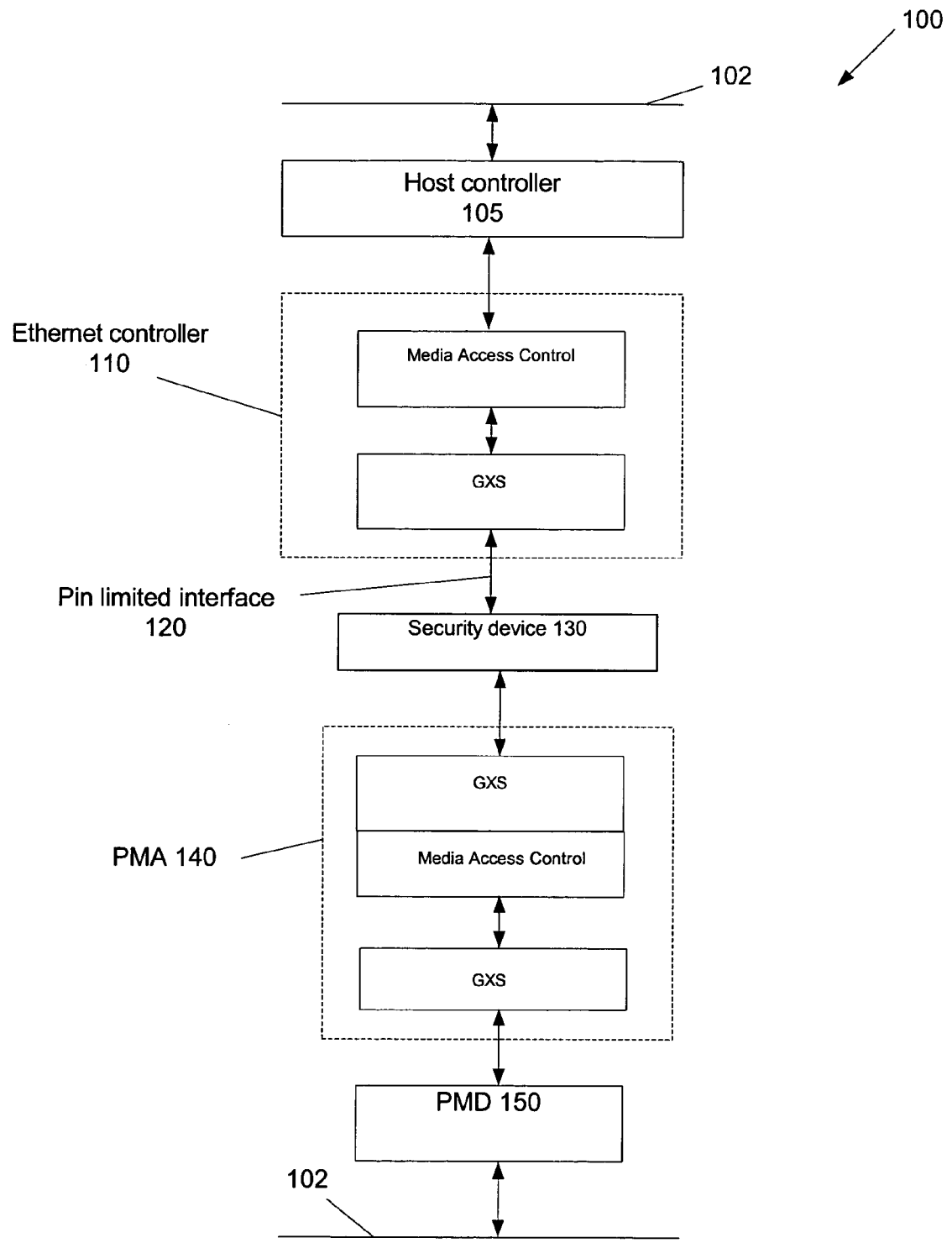
FIGS. 1-7 depict various implementations of transceiver systems in accordance with some embodiments of the invention. More specifically, each of FIGS. 1-7 illustrates a different embodiment of a transceiver system, according to different embodiments of the invention.

FIG. 1 depicts one implementation of a transceiver system 100 in accordance with an embodiment of the present invention. One implementation of transceiver system 100 may include a backplane interconnection 102, host controller 105, Ethernet controller 110 having a pin limited interface 120, security device 130, Physical Medium Attachment (PMA) device 140, and physical medium dependent (PMD) device 150.

PMD device 150 may receive and transmit optical or electrical signals encoded in compliance for example with optical transport network (OTN), Synchronous Optical Network (SONET), and/or Synchronous Digital Hierarchy (SDH) standards. Example optical networking standards may be described in ITU-T Recommendation G.709 Interfaces for the optical transport network (OTN) (2001); ANSI T1.105, Synchronous Optical Network (SONET) Basic Description Including Multiplex Structures, Rates, and Formats; Bellcore Generic Requirements, GR-253-CORE, Synchronous Optical Network (SONET) Transport Systems: Common Generic Criteria (A Module of TSGR, FR-440), Issue 1, December 1994; ITU Recommendation G.872, Architecture of Optical Transport Networks, 1999; ITU Recommendation G.825, "Control of Jitter and Wander within Digital Networks Based on SDH" March, 1993; ITU Recommendation G.957, "Optical Interfaces for Equipment and Systems Relating to SDH", July, 1995; ITU Recommendation G.958, Digital Line Systems based on SDH for use on Optical Fibre Cables, November, 1994; and/or ITU-T Recommendation G.707, Network Node Interface for the Synchronous Digital Hierarchy (SDH) (1996).

One implementation of PMD device 150 may (a) demultiplex a stream of optical or electrical signals and convert such signals from optical or electrical format to digital format and (b) multiplex signals and convert such signals from digital format to optical or electrical format. For example, PMD device 150 may perform such format conversion operations in compliance with Ethernet (as described in IEEE 802.3, IEEE 802.3ae, and related standards). One possible implementation of PMD device 150 is available from Intel Corporation, although other implementations may be used. For example, PMD device 150 may transmit or receive optical or electrical signals to or from backplane interconnection 102.

PMD device 150 may interface with PMA device 140 using an interconnection device compatible for example with 10 Gigabit Attachment Unit Interface (XAUI) as described in IEEE 802.3, IEEE 802.3ae, and related standards; Gigabit Media Independent Interface (GMII) as described in IEEE 802.3, IEEE 802.3ae, and related standards; and/or Ten Bit Interface (TBI) as described in IEEE 802.3, IEEE 802.3ae, and related standards.

PMA device 140 may receive and transmit signals from and to PMD device 150 at approximately 1 Gbps in both directions. With respect to some signals from PMD 150, one implementation of PMA device 140 may perform clock and data recovery and electrical signal retiming in compliance with IEEE 802.3, IEEE 802.3ae, and related standards. With respect to some signals from PMD 150, one implementation of PMA device 140 may perform MAC related processing (such as packet framing and link management) in compliance for example with Ethernet, described for example in versions of IEEE 802.3, IEEE 802.3ae, and related standards. PMA device 140 may perform inverse operations on signals received from security device 130. If PMD device 150 uses a XAUI compatible interface to interconnect with PMA device 140, PMA device 140 may use a GMII Extender Sublayer (GXS) to interface with such XAUI interface. A suitable implementation of PMA device 40 may be designed by those skilled in the art using for example, a MAC RTL core and a GMII Extender Sublayer (GXS) RTL core which are both available, for example, from Intel Corporation's Platform Networking Group, although other implementations may be used.

Security device 130 may receive and transmit signals from and to PMA device 140 at approximately 1 Gbps in both directions. One implementation of security device 130 may perform IP security protocol (IPSec) related processing. IPSec relates to secure data transmission at the IP layer of the Internet and is described in a collection of RFC standards maintained by the Internet Engineering Task Force (IETF). In one implementation, security device 130 may interconnect with PMA device 140 using a XAUI compatible interface or using an interface compatible with other standards such as GMII and TBI. One suitable implementation of security device 130 may be an IP security device from NetOctave integrated with a XAUI compatible interface.

In some implementations, security device 130 includes programmable configuration and control registers that may be used to control security device 130. Such configuration and control registers may control, for example, a level of security, types of security, security keys, key exchanges, key generation, connection information, and security protocol allowables. Access to the registers may be achieved by use of a side band interface channel (not depicted) compatible for example with third generation I/O (3GIO) as described in PCI-Express Specification 1.0 and related standards; or PC interface (PCI) as described in Conventional PCI 2.3 and related standards. Various other methods of configuration and control may also be used, to further lower the number of pins used. This may include methods of configuration such as inline packet based configuration, inline idle time configuration, or general management interface configuration. In one implementation, security device 130 may be provided with a unique MAC or IP address. To configure or command security device 130 or for security device 130 to communicate with other devices, the unique MAC or IP address may be used. For example, packets tagged with the MAC or IP address associated with security device 130 may be used to transmit commands to security device 130. For example, for security device 130 to communicate with other devices, security device 130 may transmit packets that identify the security device 130 using an associated unique MAC or IP address. Various other methods of configuration and control may also be used, to further lower the number of pins used.

Ethernet controller 110 may receive and transmit signals from and to security device 130 at approximately 1 Gbps in both directions. One implementation of Ethernet controller 110 may perform data store and forwarding to appropriate host buffers in accordance with standard Ethernet controller functionality described in IEEE 802.3, IEEE 802.3ae, and related standards. For example, one implementation of Ethernet controller 110 is available from Intel Corporation although other implementations may be used.

A physical implementation of Ethernet controller 110 may utilize a limited number of pins (shown as pin limited interface 120) to interface with external devices. In one implementation, if a XAUI interface is used to interface with Ethernet controller 110, Ethernet controller 110 may utilize a GMII Extender Sublayer (GXS), as described in IEEE 802.3, IEEE 802.3ae, and related standards, to interconnect with such XAUI interface.

To interconnect with pin limited interface 120 of Ethernet controller 110, one implementation of security device 130 may utilize a XAUI compatible interconnect having at least 4 pins (for example, 1 pin pair to transmit signals and 1 pin pair to receive signals). In this example, each pin pair may transmit information at approximately 1.25 Ghz or 1 Gbps. However, other interfaces having the same or other number of pins may be used.

If an "off-the-shelf" implementation of Ethernet controller 110 with MAC processing capability is used, to the extent PMA 140 performs MAC processing operations, similar MAC processing operations that Ethernet controller 110 could perform may be disabled but do not have to be disabled.

Security device 130 may insert IPSec related information into the header of each IP packet from Ethernet controller 110. Accordingly, with the addition of IPSec related information into the header of each IP packet from Ethernet controller 110, the byte transmission rate from security device 130 to PMA 140 (or other device downstream from security device 130 and Ethernet controller 110) may exceed 1 Gbps. However, a XAUI interface between the security device 130 and PMA 140 may have a maximum transmission rate of 1 Gbps. In accordance with an embodiment of the present invention, some implementations of the present invention may reduce the transmission rate of information from Ethernet controller 110 to security device 130 to below 1 Gbps (or other maximum interconnection transmission rate, as the case may be). Hereafter such rate reduction techniques may be referred to as "rate limiting" techniques.

For example, one implementation of Ethernet controller 130 may slow down the maximum packets per second transmitted by the Ethernet controller 110 to the security device 130. This implementation may provide an inter-packet gap (e.g., a programmable number of bytes between packets) to achieve a desired information transfer rate between Ethernet controller 110 and security device 130.

Another implementation of Ethernet controller 130 may provide unique interpacket gaps based on specific inter-computer connections that utilize system 100 to transfer IP packets. For example, each computer in the inter-computer connection may be identified using an IP or MAC address. For example, a first inter-computer connection may not be security protected in accordance with IPSec and so little or no interpacket gap is provided because few or no IPSec information is inserted by security device 130 for such connection. A second inter-computer connection may be security protected in accordance with IPSec and so a larger interpacket gap may be inserted by security device 130 because more IPSec information is inserted by security device 130 for such connection. For example, an inter-packet gap may be 5 bytes for information transmitted between a first inter-computer connection, but 15 bytes for information transmitted between a second inter-computer connection.

Unique inter-packet gap information could be sent with data portions provided by a host or source computer. For example, a host, or a source computer, or a TCP IP offload engine built into Ethernet controller 110, may store a table of inter-packet gap information for inter-computer connections. For example, the inter-packet gap information for inter-computer connections may be stored in an IP Routing Table which has information about inter-computer connections, or in another table or memory structure which stores details about inter-computer connections.

Another implementation of Ethernet controller 130 may use flow control messaging between the Ethernet controller 110 and the security device 130 where messaging is provided among packets transferred using the XAUI interface or through sideband channels/signals for packet slow down. Flow control messaging (such as ready or overflow signals) could be implemented using extra wires or signals or specific flow control messages over the XAUI interface in the form of specially formatted packets or data such that the Ethernet controller 130 can recognize a command to slow down transmission rate based on these messages.

In another implementation of Ethernet controller 130, Ethernet controller 130 issues a pause request command to one or more sources of information (such as host controller 105) so that the particular source temporarily pauses transmission of packets. For example, Ethernet controller 130 may transmit pause requests using flow control packets generally described for example in IEEE 802.3, IEEE 802.3ae, and related standards.

For yet another implementation, security device 130 could be configured to discard any packets that exceed its transmit rate of 1 Gbps to PMA 140 (or other maximum transmission rate between security device 130 and PMA 140). For example, security device 130 may take into account the addition of IPSec headers and information in determining whether the 1 Gbps transmit rate (or other maximum transmission rate between security device 130 and PMA 140) is exceeded.

Host controller 105 may receive signals processed by Ethernet controller 110 and transmit signals to Ethernet controller 110 at approximately 1 Gbps in both directions. One implementation of host controller 105 may perform optical transport network (OTN) de-framing and de-wrapping in compliance for example with ITU-T G.709; forward error correction (FEC) processing, in accordance with ITU-T G.975; layer 2 CRC checking; and/or other layer 2 processing. For example, one implementation of host controller 105 is available from Intel Corporation, although other implementations may be used. Suitable interface standards to interconnect host controller 105 with Ethernet controller 110 include, but are not limited to, PCI, 3GIO, and Permission-based Customer Information Exchange (PCIx) as described in PCI-X 2.0.

In some implementations, host controller 105 may transmit and receive signals to and from backplane interconnection 102 such as a Blade type (currently being promulgated) and other backplane types. Backplane interconnection 102 may interconnect host controller 105 with memory devices (not depicted) and/or a switch fabric (not depicted).

Figure 2:
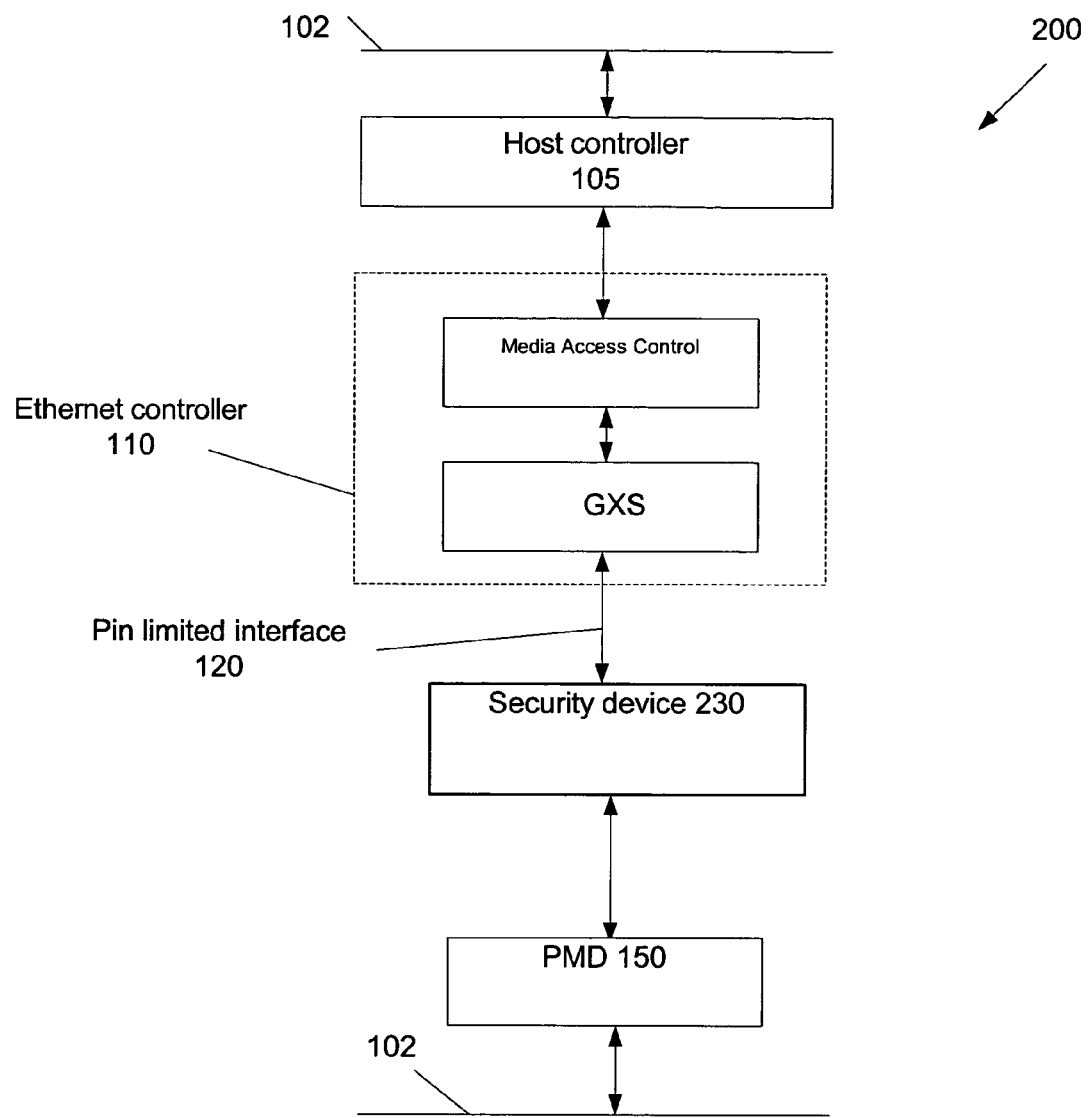

FIG. 2 depicts a suitable implementation of a transceiver system 200 in accordance with an embodiment of the present invention. One implementation of transceiver system 200 may include a backplane interconnection 102, host controller 105, Ethernet controller 110 having a pin limited interface 120, security device 230, and PMD device 150.

Security device 230 may receive and transmit signals from and to PMD device 150 at approximately 1 Gbps in both directions. PMD device 150 may interface with security device 230 using an interface compatible for example with XAUI, GMII, and/or TBI. One implementation of security device 230 may perform IP security protocol related processing in compliance with IPSec as well as MAC processing such as packet framing and link management in compliance for example with IEEE 802.3, IEEE 802.3ae, and related standards as well as operations that may be performed by PMA 140.

In one implementation, to the extent security device 230 performs MAC processing operations, similar MAC processing operations that Ethernet controller 110 could perform may be disabled but do not have to be disabled.

Security device 230 may use a XAUI compatible interface having at least four pins (for example, 1 pin pair to transmit signals and 1 pin pair to receive signals) to communicate with pin-limited interface 120 of Ethernet controller 110. In this example, each pin pair may transfer information at approximately 1.25 Ghz or 1 Gbps. Other interfaces having the same or different numbers of pins may be used. One suitable implementation of security device 230 may include an IP security device from NetOctave integrated with a XAUI compatible interface (or other interface) as well as MAC processing capability described earlier.

In some implementations, security device 230 includes programmable configuration and control registers that may be used to control security device 230. Such configuration and control registers may control, for example, a level of security, types of security, security keys, key exchanges, key generation, connection information, and security protocol allowables. Access to the registers may be achieved by use of a side band interface channel (not depicted) compatible for example with third generation I/O (3GIO) as described in PCI-Express Specification 1.0 and related standards; or PC interface (PCI) as described in Conventional PCI 2.3 and related standards. Various other methods of configuration and control may also be used, to further lower the number of pins used. This may include methods of configuration such as inline packet based configuration, inline idle time configuration, or general management interface configuration.

In one implementation, security device 230 may be provided with a unique MAC or IP address. To configure or command security device 230 or for security device 230 to communicate with other devices, the unique MAC or IP address may be used. For example, packets tagged with the MAC or IP address associated with security device 230 may be used to transmit commands to security device 230. For example, for security device 230 to communicate with other devices, security device 230 may transmit packets that identify the security device 230 using an associated unique MAC or IP address. Various other methods of configuration and control may also be used to further lower the number of pins used.

To account for the addition of IPSec related bytes into IP packet headers by security device 230, in one implementation, security device 230 could be configured to discard any packets that exceed its transmit rate of 1 Gbps to PMD 150 (or other maximum transmission rate between security device 230 and PMD 150). For example, security device 230 may take into account the addition of IPSec headers or information in determining whether the 1 Gbps transmit rate (or other maximum transmission rate between security device 230 and PMD 150) is exceeded. For example to account for addition of IPSec headers or information, either or both of security device 230 and Ethernet controller 110 may use "rate limiting" techniques described with respect to respective security device 130 and Ethernet controller 110 with respect to FIG. 1.

Figure 3:
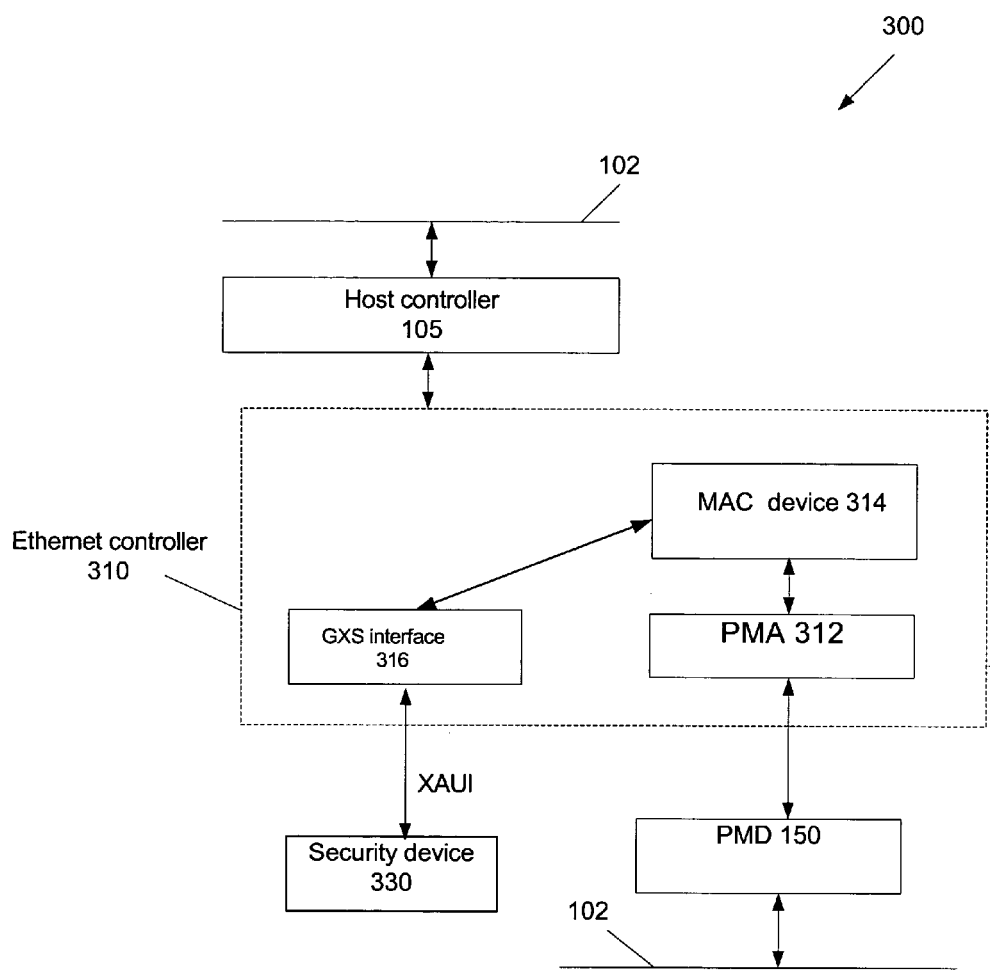

FIG. 3 depicts a suitable implementation of a transceiver system 300 in accordance with an embodiment of the present invention. One implementation of transceiver system 300 may include a backplane interconnection 102, host controller 105, Ethernet controller 310, security device 330, and PMD device 150.

PMD device 150 may interface with Ethernet controller 310 using an interface compatible for example with XAUI, GMII, and/or TBI. Ethernet controller 310 may receive and transmit signals from and to PMD device 150 at approximately 1 Gbps in both directions.

In one implementation, Ethernet controller 310 may include a PMA 312, MAC device 314, and a GXS interface 316. PMA 312, MAC device 314, and a GXS interface 316 may be implemented within the same die. PMA 312 may transmit and receive signals to and from PMD device 150. PMA 312 may perform operations similar to those of PMA 140. PMA 312 may communicate with MAC device 314 using internal die interconnects such as GMII or other similar interfaces. MAC device 314 may transmit and receive signals to and from PMA 312. MAC device 314 may perform MAC processing such as packet framing and link management in compliance for example with Ethernet as described in IEEE 802.3, IEEE 802.3ae, and related standards.

In one implementation, Ethernet controller 310 may utilize a GMII extender sublayer (shown as GXS interface 316) to interconnect with XAUI compatible interfaces. GXS interface 316 may (a) receive and transmit signals from and to MAC device 314 and (b) receive and transmit signals from and to security device 330.

One suitable implementation of Ethernet controller 310 is available for example from Intel Corporation. For example, if an "off-the-shelf" implementation of Ethernet controller 310 is used, the design of such implementation may be modified to include a GXS interface 316 for XAUI compatible interfaces.

Security device 330 may perform similar operations and be implemented in a similar manner as security device 130 except for providing a two-way communication with Ethernet controller 310. For example, to accommodate information transfer downstream to PMD 150 at approximately 1 Gbps, security device 330 may use two two-pin XAUI compatible interfaces coupled with Ethernet controller 310. For example, one two-pin pair may be used to transmit information from Ethernet controller 310 for processing by security device 330 whereas one two-pin pair may be used by Ethernet controller 310 to receive information processed by security device 330. Similarly, to accommodate information transfer upstream to host controller 105 at approximately 1 Gbps, security device 330 may use two two-pin XAUI compatible interfaces with Ethernet controller 310. Other interfaces having the same or different numbers of pins may be used to provide communications between security device 330 and Ethernet controller 310.

Suitable interface standards to interconnect host controller 105 with Ethernet controller 310 may include, but are not limited to, PCI, 3GIO, and Permission-based Customer Information Exchange (PCIx) as described in PCI-X 2.0.

Figure 4:
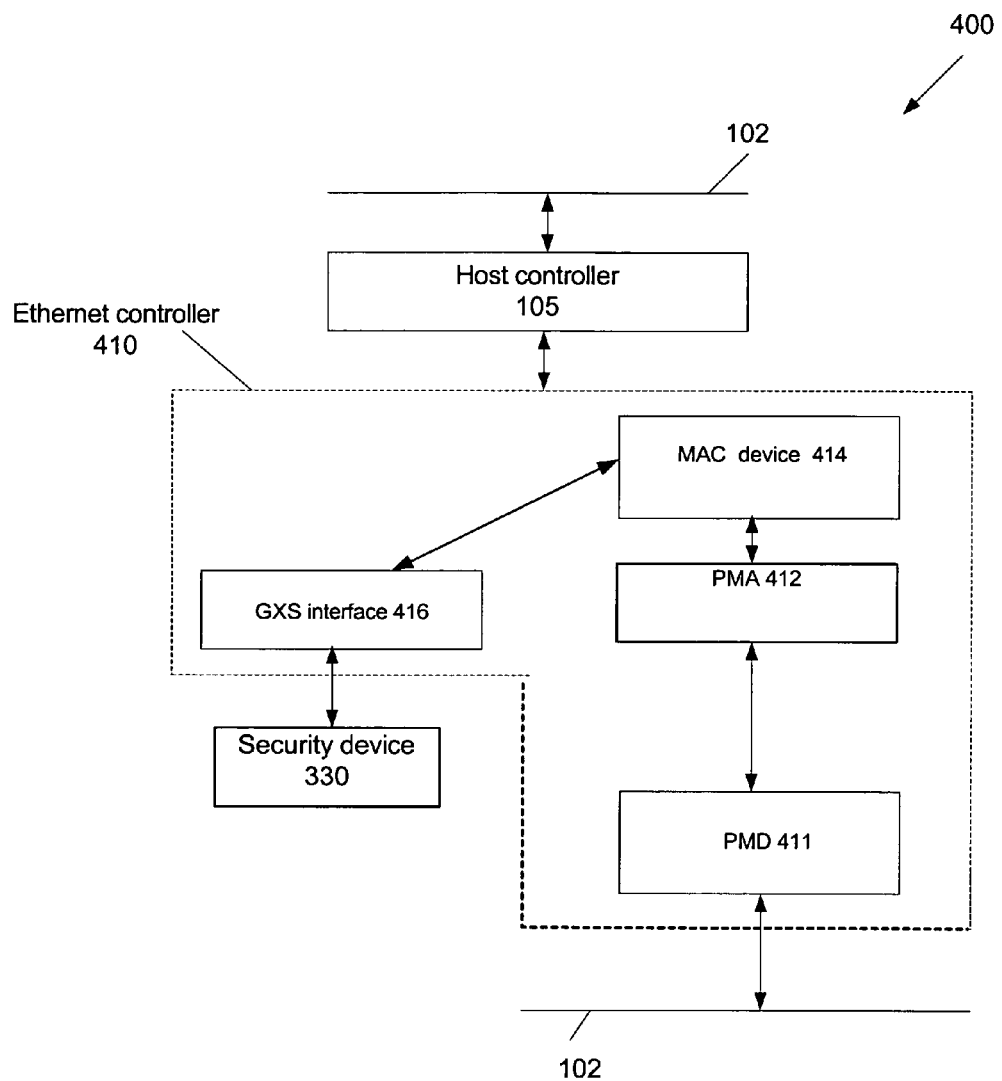

FIG. 4 depicts a suitable implementation of a tranceiver system 400 in accordance with an embodiment of the present invention. One implementation of transceiver system 400 may include a backplane interconnection 102, host controller 105, Ethernet controller 410, and security device 330.

Ethernet controller 410 may include a PMD 411, PMA 412, MAC device 414, and a GXS interface 416. PMD 411, PMA 412, MAC device 414, and GXS interface 416 may be implemented within the same die. Except as otherwise stated herein, PMD 411, PMA 412, MAC device 414, and GXS interface 416 may be implemented similarly and perform similar operations as respective PMD 150, PMA 312, MAC device 314, and GXS interface 316. Ethernet controller 410 may be implemented using a core available from Intel Corporation, integrated with a XAUI compatible interface such as GXS interface 316.

A physical implementation of Ethernet controller 410 may utilize a limited number of pins to interface with external devices. In one implementation, Ethernet controller 410 may utilize a GMII Extender Sublayer (shown as GXS interface 416) to interconnect with XAUI interfaces. For example, security device 330 may use XAUI compatible interfaces to interface with GXS interface 416 of Ethernet controller 410 to both transmit and receive information.

For example, to accommodate information transfer downstream to PMD 411 at approximately 1 Gbps, security device 330 may use two two-pin XAUI compatible interfaces with Ethernet controller 410. One two-pin pair may be used to transmit information from Ethernet controller 410 for processing by security device 330 whereas one two-pin pair may be used by Ethernet controller 410 to receive information processed by security device 330. Similarly, to accommodate information transfer upstream to host controller 105 at approximately 1 Gbps, security device 330 may use two two-pin XAUI compatible interfaces with Ethernet controller 410. Other interfaces having the same or different numbers of pins may be used to provide communications between security device 330 and Ethernet controller 410.

Suitable interface standards to interconnect host controller 105 with Ethernet controller 410 include, but are not limited to, PCI, 3GIO, and Permission-based Customer Information Exchange (PCIx) as described in PCI-X 2.0.

Figure 5:
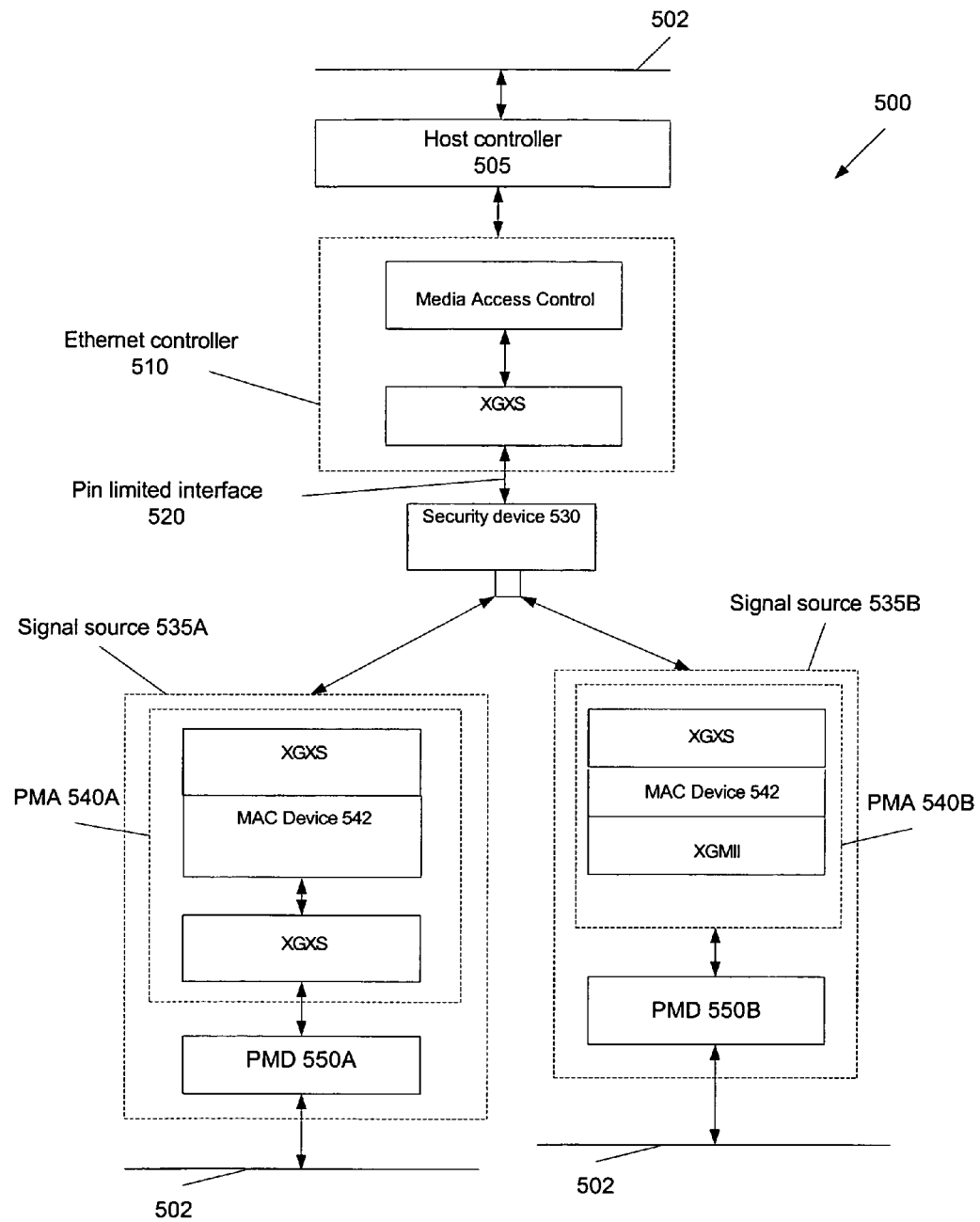
Figure 6:
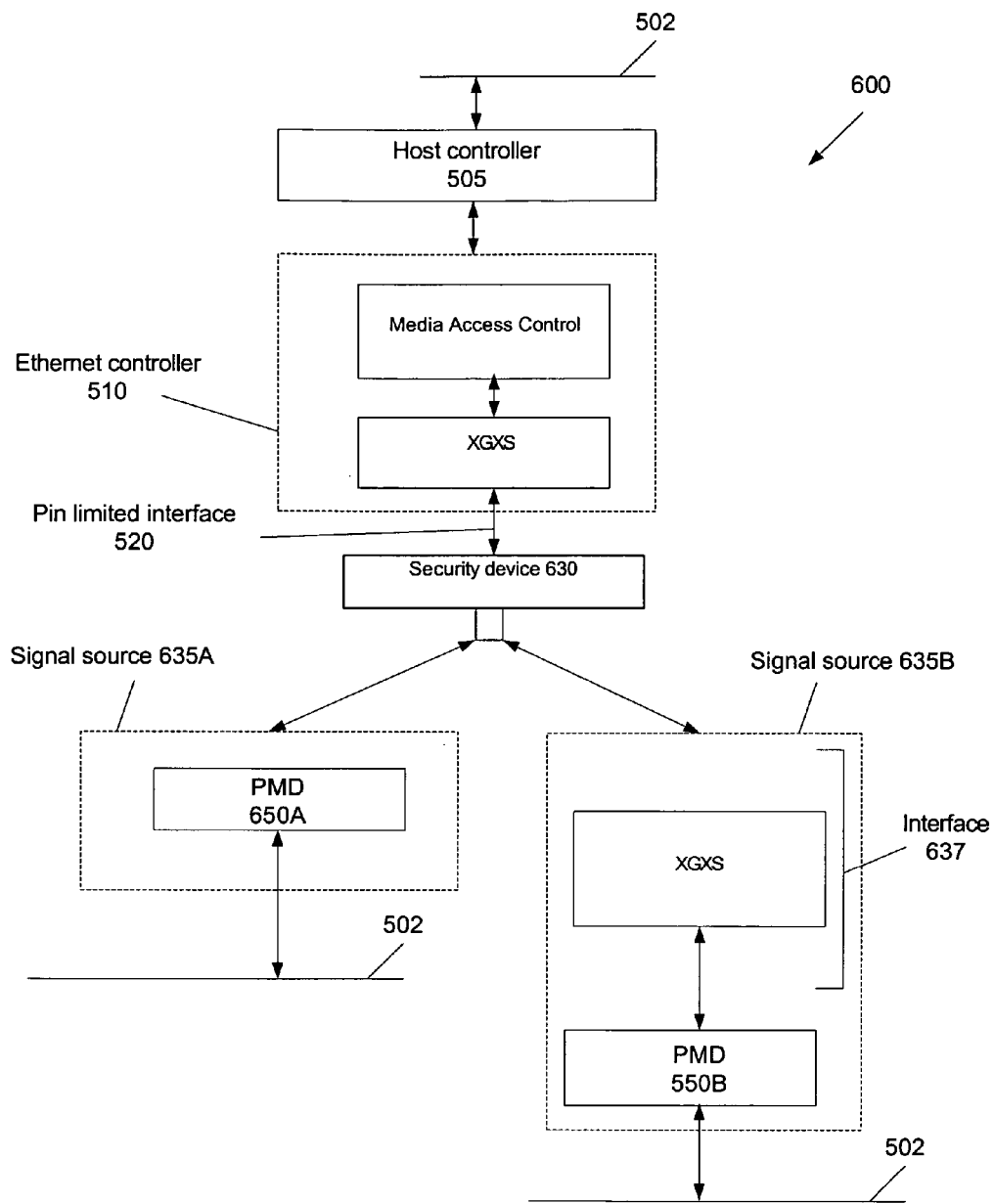
Figure 7:
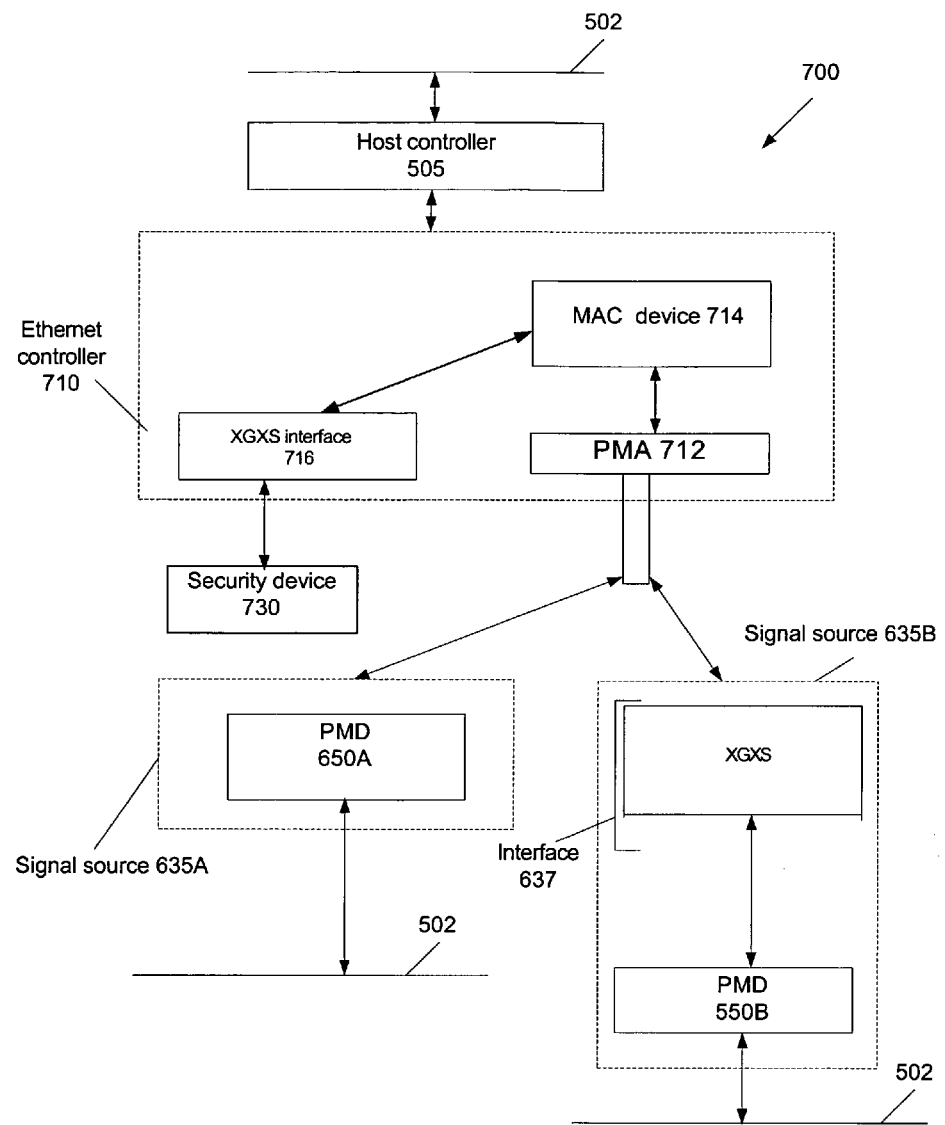

FIGS. 5, 6, and 7 depict example implementations of respective transceiver systems 500, 600, and 700 in accordance with embodiments of the present invention. Such transceiver systems may process information flow rates of approximately 10 Gbps in both transmit and receive directions.

FIG. 5 depicts a suitable implementation of a transceiver system 500 in accordance with an embodiment of the present invention. One implementation of transceiver system 500 may include a backplane interconnection 502, host controller 505, Ethernet controller 510 having a pin limited interface 520, security device 530, and either signal source 535A or 535B. Host controller 505, Ethernet controller 510 having a pin limited interface 520, and security device 530 may be implemented similarly and perform similar operations as respective host controller 105, Ethernet controller 110 having a pin limited interface 120, and security device 130 except at least for providing information flow through at approximately 10 Gbps in both transmit and receive directions.

One implementation of signal source 535A may include PMD device (PMD) 550A and PMA device (PMA) 540A. For example, PMD device 550A may transmit or receive optical or electrical signals to or from backplane interconnection 502. PMD 550A may receive optical or electrical signals in parallel format from backplane interconnection 502 and may convert such signals into serial format electrical signals compliant for example with the XAUI format. PMD 550A may further receive and transmit optical or electrical signals to an optical or electrical network (not depicted). For example, optical or electrical signals to and from an optical or electrical network may be wave division multiplexed signals transmitted in accordance with 10GBASE-LX4 or other optical or electrical signal transport standards that permit transmission at approximately 10 Gbps. PMD 550A may perform inverse operations on signals received from PMA 540A.

PMA device 540A may transmit and receive signals to and from PMD device 550A. One implementation of PMA device 540A may perform clock and data recovery and electrical signal retiming on signals from PMD device 550A in compliance with IEEE 802.3, IEEE 802.3ae, and related standards. One implementation of PMA device 540A may include MAC device 542 to perform MAC related processing (such as packet framing and link management) on signals from PMD device 550A in compliance for example with Ethernet, described for example in versions of IEEE 802.3, IEEE 802.3ae, and related standards. PMA device 540A may perform inverse operations on signals received from security device 530. If PMD 550A uses a 10 Gbps XAUI compatible interface to interconnect with PMA 540A, PMA 540A may use an XGMII Extender Sublayer (XGXS) to interface with such XAUI interface.

One implementation of signal source 535B may include PMD device 550B and PMA device 540B. For example, PMD 550B may transmit or receive optical or electrical signals to or from backplane interconnection 502. Further, PMD 550B may receive and transmit optical or electrical signals from and to an optical or electrical network (not depicted). PMD 550B may receive signals in serial format and convert the format of such signals into digital format. For example, optical or electrical signals from the optical or electrical network may be transmitted in accordance with 10GBASE-R or other standards that permit transmission at approximately 10 Gbps. Conversely, PMD 550B may convert the format of digital signals from PMA 540B into a format compliant with 10GBASE-R or other standards that permit transmission at approximately 10 Gbps and PMD 550B may further provide format converted signals for transmission to an optical or electrical network. PMD 550B may utilize a 10 Gigabit Sixteen Bit Interface (XSBI) compatible with IEEE 802.3, IEEE 802.3ae, and related standards to interface with the PMA 540B.

PMA 540B may transmit and receive signals to and from PMD 550B. PMA 540B may include a media access control (MAC) device 542 to perform MAC tasks in accordance with Ethernet as described for example in IEEE 802.3, IEEE 802.3ae, and related standards. PMA 540B may utilize an XGMII interface to communicate with an XSBI interface of PMD 550B.

Security device 530 may receive signals processed by either signal source 535A or 535B and transmit signals to either signal source 535A or 535B. Security device 530 may interconnect with signal source 535A or 535B using a 10 Gbps XAUI compatible interface. Security device 530 may be implemented similarly and perform similar operations as security device 130 except at least for providing information flow through at approximately 10 Gbps in both transmit and receive directions.

Ethernet controller 510 may receive signals processed by security device 530 and transmit signals to security device 530 at approximately 10 Gbps in both directions. Ethernet controller 510 may be implemented similarly and perform similar operations as Ethernet controller 110 except at least for providing information flow through at approximately 10 Gbps in both transmit and receive directions. A physical implementation of Ethernet controller 510 may utilize a limited number of pins (shown as pin limited interface 520) to interface with external devices. In one implementation, if a 10 Gbps XAUI interface is used to interface with Ethernet controller 510, Ethernet controller 510 may utilize an XGMII Extender Sublayer (XGXS), as described in IEEE 802.3, IEEE 802.3ae, and related standards, to interconnect with such XAUI interface.

To interconnect with pin limited interface 520 of Ethernet controller 510, one implementation of security device 530 may utilize a 10 Gbps XAUI compatible interface. For example, to receive information from the Ethernet controller 510 at approximately 10 Gbps, security device 530 may use four two-pin XAUI compatible interfaces. For example, to transmit information to the Ethernet controller 510 at approximately 10 Gbps, security device 530 may use four two-pin XAUI compatible interfaces. In this example, four pin pairs together may transfer information at 10 Gbps. Other interfaces having the same or other number of pins may be used.

To account for the addition of IPSec related bytes into IP packet headers by security device 530 and the maximum bandwidth between security device 530 and signal source 535A or 535B, in one implementation, Ethernet controller 510 may utilize techniques similar to "rate limiting" techniques as described with respect to Ethernet controller 110.

Host controller 505 may transmit and receive signals to and from Ethernet controller 510 at approximately 10 Gbps in both directions. Host controller 505 may be implemented similarly and perform similar operations as host controller 105 except at least for providing information flow through at approximately 10 Gbps in both transmit and receive directions. Ethernet controller 510 may communicate with host controller 505 using a PCI, 3GIO, PCIx, PCI-X 2.0 DDR or QDR and 3GIO 8 Lanes or other interface.

In some implementations, host controller 505 may transmit and receive signals to and from backplane interconnection 502 compatible for example with Blade (currently being promulgated) and other backplane types. Backplane interconnection 502 may interconnect host controller 505 with memory devices (not depicted) and/or a switch fabric (not depicted).

FIG. 6 depicts one possible implementation of a transceiver system 600 in accordance with an embodiment of the present invention. One implementation of transceiver system 600 may include a backplane interconnection 502, host controller 505, Ethernet controller 510 having a pin limited interface 520, security device 630, and either signal source 635A or 635B.

One implementation of signal source 635A may include PMD device 650A. For example, PMD 650A may transmit or receive optical or electrical signals to or from backplane interconnection 502. PMD 650A may transmit or receive optical or electrical signals to or from an optical or electrical signal network (not depicted). PMD 650A may receive optical or electrical signals in serial format from an optical or electrical network or backplane interconnection 502 and convert the format of such signals into digital format in accordance with IEEE 802.3, IEEE 802.3ae and related standards. PMD 650A may perform inverse operations on digital format signals received from security device 630.

One implementation of signal source 635B may include interface 637 and PMD device 550B. For example, PMD 550B may transmit or receive optical or electrical signals to or from backplane interconnection 502 or an optical or electrical signal network. PMD 550B is described with respect to FIG. 5. PMD 550B may utilize a 10 Gigabit Sixteen Bit Interface (XSBI) compatible with IEEE 802.3, IEEE 802.3ae, and related standards to interface with the interface 637.

Interface 637 may utilize an XGXS to intercouple the XSBI interface of PMD 550B with a 10 Gbps XAUI compatible interface.

Security device 630 may transmit and receive signals from and to signal source 635A or 635B. Security device 630 may interconnect with PMD 650A (of signal source 635A) or interface 637 (of signal source 635B) using a 10 Gbps XAUI compatible interface. Other interfaces having the same or different number of pins may be used. Security device 630 may be implemented similarly and perform similar operations as security device 230 except at least for providing information flow through at approximately 10 Gbps in both transmit and receive directions.

Security device 630 may interconnect with pin limited interface 520 of Ethernet controller 510 using for example a 10 Gbps XAUI compatible interface. For example, to receive information from the Ethernet controller 510 at approximately 10 Gbps, security device 630 may use four two-pin XAUI compatible interfaces. For example, to transmit information to the Ethernet controller 510 at approximately 10 Gbps, security device 630 may use four two-pin XAUI compatible interfaces. In this example, the four pin pairs together may transfer information at 10 Gbps. Other interfaces having the same or other number of pins may be used.

FIG. 7 depicts a suitable implementation of a transceiver system 700 in accordance with an embodiment of the present invention. One implementation of transceiver system 700 may include a backplane interconnection 502, host controller 505, Ethernet controller 710, security device 730, and either signal source 635A or 635B.

Signal source 635A or 635B may interconnect with Ethernet controller 710 using a 10 Gbps XAUI compatible or other type of interface.

Ethernet controller 710 may include a PMA 712, MAC device 714, and a XGXS interface 716. PMA 712, MAC device 714, and an XGXS interface 716 may be implemented within the same die. PMA 712 may transmit and receive signals to and from either signal source 635A or 635B. PMA 712 may perform operations similar to those of and be implemented similarly as PMA 312 except for providing approximately 10 Gbps flow through rate in both receive and transmit directions.

MAC device 714 may perform MAC processing such as packet framing and link management in compliance for example with Ethernet as described in IEEE 802.3, IEEE 802.3ae, and related standards. MAC device 714 may transmit and receive signals to and from PMA 712. MAC device 714 may communicate with PMA 712 using internal die interconnects compatible for example with XGMII.

A physical implementation of Ethernet controller 710 may utilize a limited number of pins to interface with external devices. In one implementation, Ethernet controller 710 may utilize an XGMII Extender Sublayer (shown as XGXS interface 716) to interconnect with XAUI compatible interfaces. XGXS interface 716 may (a) receive and transmit signals from and to MAC device 714 and (b) receive and transmit signals from and to security device 730.

For example, security device 730 may use sixteen two-pin XAUI compatible interfaces to receive and transmit information with the Ethernet controller 710 at approximately 10 Gbps in each direction. For example, to accommodate information transfer downstream to signal source 635A or 635B at approximately 10 Gbps, security device 730 may use eight two-pin XAUI compatible interfaces with Ethernet controller 710. Four two-pin pairs may be used to transmit information for processing by security device 730 whereas four two-pin pairs may be used to receive information processed by security device 730. Similarly, to accommodate information transfer upstream to host controller 505 at approximately 10 Gbps, security device 730 may use eight two-pin XAUI compatible interfaces with Ethernet controller 710. In this example, the four pin pairs together may transfer information at 10 Gbps. Other interfaces having the same or different numbers of pins may be used to provide communications between security device 730 and Ethernet controller 710.

Security device 730 may perform similar operations and be implemented in a similar manner as security device 530 except for providing a two-way communication with Ethernet controller 710 at approximately 10 Gbps in both directions.

Host controller 505 may transmit and receive signals to and from Ethernet controller 710 at approximately 10 Gbps in both directions. Ethernet controller 710 may communicate with host controller 505 using a PCI, 3GIO, PCIx, PCI-X 2.0 DDR or QDR and 3GIO 8 Lanes or other interface.

Modifications

The drawings and the forgoing description gave examples of the present invention. The scope of the present invention, however, is by no means limited by these specific examples. Numerous variations, whether explicitly given in the specification or not, such as differences in structure, dimension, and use of material, are possible. For example, the techniques described herein could apply to lower or higher speed bit transmission rates. For example, other numbers of pins may be used to interconnect devices. For example, interfaces other than XAUI compatible interfaces may be used. The scope of the invention is at least as broad as given by the following claims.

What is claimed is:

1. An apparatus comprising:
a security device to perform security related operations on received signals; and
an Ethernet controller comprising an interface to provide communications with the security device,
wherein the security device has an associated unique address and wherein the Ethernet controller selectively slows down transmission of packets to the security device in response to receipt of a message to slow down transmission.

2. The apparatus of claim 1, wherein the Ethernet controller comprises:
a media access control device to perform media access control operations in compliance with Ethernet; and
a GMII extender sublayer to interconnect the security device with the media access control device.

3. The apparatus of claim 1, wherein the interface comprises a XAUI compatible interface.

4. The apparatus of claim 1, wherein the Ethernet controller comprises:
a media access control device to perform media access control operations in compliance with Ethernet; and
an XGMII extender sublayer to interconnect the security device with the media access control device.

5. The apparatus of claim 4, wherein the interface comprises a XAUI compatible interface.

6. The apparatus of claim 1, wherein the Ethernet controller comprises:
a physical medium attachment to perform electrical signal retiming operations;
a media access control device to receive and provide signals with the physical medium attachment and to perform media access control operations in compliance with Ethernet; and
an extender sublayer to interconnect the security device with the media access control device and to provide communications between the media access control device and the security device.

7. The apparatus of claim 6, wherein the extender sublayer comprises a GMII extender sublayer.

8. The apparatus of claim 7, wherein the interface comprises a XAUI compatible interface.

9. The apparatus of claim 6, wherein the extender sublayer comprises an XGMII extender sublayer.

10. The apparatus of claim 9, wherein the interface comprises a XAUI compatible interface.

11. The apparatus of claim 1, wherein the Ethernet controller comprises:
physical medium dependent device to perform optical-to-electrical signal conversion and electrical-to-optical signal conversion; and
physical medium attachment to receive and provide signals with the physical medium dependent device and to perform media access control operations in compliance with Ethernet;
a media access control device to receive and provide signals with the physical medium attachment and to perform media access control operations in compliance with Ethernet; and
an extender sublayer to interconnect the security device with the media access control device and to provide communications between the media access control device and the security device.

12. The apparatus of claim 11, wherein the extender sublayer comprises a GMII extender sublayer.

13. The apparatus of claim 12, wherein the interface comprises a XAUI compatible interface.

14. The apparatus of claim 1, wherein the security device comprises logic circuitry to perform IP security protocol related processing.

15. The apparatus of claim 3, wherein the security device comprises logic circuitry to perform IP security protocol related processing.

16. The apparatus of claim 5, wherein the security device comprises logic circuitry to perform IP security protocol related processing.

17. The apparatus of claim 8, wherein the security device comprises logic circuitry to perform IP security protocol related processing.

18. The apparatus of claim 10, wherein the security device comprises logic circuitry to perform IP security protocol related processing.

19. The apparatus of claim 13, wherein the security device comprises logic circuitry to perform IP security protocol related processing.

20. The apparatus of claim 3, wherein the security device comprises:
logic circuity to perform IP security protocol related processing; and
a media access control device to perform media access control operations in compliance with Ethernet.

21. The apparatus of claim 5, wherein the security device comprises:
logic circuity to perform IP security protocol related processing; and
a media access control device to perform media access control operations in compliance with Ethernet.

22. The apparatus of claim 1, wherein the Ethernet controller selectively inserts a programmable byte space among packets.

23. The apparatus of claim 22, wherein the programmable byte space is based upon an inter-computer connection.

24. The apparatus of claim 22, wherein the programmable byte space is based upon pre-determined information concerning a destination computer.

25. The apparatus of claim 1, wherein the security device transmits a message to slow down to the Ethernet controller in response to packets transmitted from the Ethernet controller to the security device exceeding a specified rate.

26. The apparatus of claim 1, wherein the Ethernet controller selectively transmits a message to a source of packets in response to the Ethernet controller receiving packets at a rate approximately the same or higher than a predetermined threshold rate and wherein the message comprises a message to slow packet transmission to the Ethernet controller.

27. The apparatus of claim 26, wherein the source comprises a host controller.

28. The apparatus of claim 1, wherein the Ethernet controller selectively discards packets in response to packet receipt rate exceeding a predetermined threshold rate.

29. The apparatus of claim 1, wherein the security device selectively discards packets in response to packet receipt rate exceeding a predetermined threshold rate.

30. The apparatus of claim 1, wherein packets communicate commands to the security device based on the address.

31. The apparatus of claim 1, wherein the address comprises an IP address.

32. The apparatus of claim 1, wherein the address comprises a MAC address.

33. A system comprising:
a physical medium dependent device to perform optical-to-electrical signal conversion and electrical-to-optical signal conversion;
a physical medium attachment device to receive and provide signals with the physical medium dependent device and to perform media access control operations in compliance with Ethernet;
a security device to perform security related operations on received signals;
an Ethernet controller to perform media access control operations in compliance with Ethernet and comprising an interface to provide communications with the security device;
a host controller to receive and transmit signals with the Ethernet controller; and
a backplane interconnection to provide intercommunication at least among host controller and physical medium dependent device.

34. The system of claim 33, wherein the interface comprises a XAUI compatible interface.

35. The system of claim 33, wherein the Ethernet controller selectively inserts a programmable byte space among packets.

36. The system of claim 35, wherein the programmable byte space is based upon an inter-computer connection.

37. The system of claim 35, wherein the programmable byte space is based upon pre-determined information concerning a destination computer.

38. The system of claim 33, wherein the Ethernet controller selectively slows down transmission of packets to the security device in response to receipt of a message to slow down transmission.

39. The system of claim 33, wherein the security device transmits the message to slow down to the Ethernet controller in response to packets transmitted from the Ethernet controller to the security device exceeding a specified rate.

40. The system of claim 33, wherein the Ethernet controller selectively transmits a message to the host controller in response to the Ethernet controller receiving packets at a rate approximately the same or higher than a predetermined threshold rate and wherein the message comprises a message to slow packet transmission to the Ethernet controller.

41. The system of claim 33, wherein the Ethernet controller selectively discards packets in response to packet receipt rate exceeding a predetermined threshold rate.

42. The system of claim 33, wherein the security device selectively discards packets in response to packet receipt rate exceeding a predetermined threshold rate.

43. The system of claim 33, wherein the media access control device of the Ethernet controller and the PMA substantially do not perform the same operations.

44. The system of claim 33, wherein the host controller comprises logic to perform media access control in compliance with IEEE 802.3.

45. The system of claim 33, wherein the host controller comprises logic to perform optical transport network deframing in compliance with ITU-T G.709.

46. The system of claim 33, wherein the host controller comprises logic to perform forward error correction processing in compliance with ITU-T G.975.

47. The system of claim 33, further comprising a switch fabric coupled to the backplane interconnection.

48. The system of claim 33, further comprising a packet processor coupled to the backplane interconnection.

49. A system comprising:
a physical medium dependent device to perform optical-to-electrical signal conversion and electrical-to-optical signal conversion;
a security device to receive and transmit signals with the physical medium dependent device and to perform security related operations on received signals;
an Ethernet controller to perform media access control operations in compliance with Ethernet and comprising an interface to provide communications with the security device;
a host controller to receive and transmit signals with the Ethernet controller; and
a backplane interconnection to provide intercommunication at least among host controller and physical medium dependent device.

50. The system of claim 49, wherein the interface comprises a XAUI compatible interface.

51. The system of claim 49, wherein the Ethernet controller selectively inserts a programmable byte space among packets.

52. The system of claim 51, wherein the programmable byte space is based upon an inter-computer connection.

53. The system of claim 51, wherein the programmable byte space is based upon pre-determined information concerning a destination computer.

54. The system of claim 49, wherein the Ethernet controller selectively slows down transmission of packets to the security device in response to receipt of a message to slow down transmission.

55. The system of claim 49, wherein the security device transmits the message to slow down to the Ethernet controller in response to packets transmitted from the Ethernet controller to the security device exceeding a specified rate.

56. The system of claim 49, wherein the Ethernet controller selectively transmits a message to the host controller in response to the Ethernet controller receiving packets at a rate approximately the same or higher than a predetermined threshold rate and wherein the message comprises a message to slow packet transmission to the Ethernet controller.

57. The system of claim 49, wherein the Ethernet controller selectively discards packets in response to packet receipt rate exceeding a predetermined threshold rate.

58. The system of claim 49, wherein the security device selectively discards packets in response to packet receipt rate exceeding a predetermined threshold rate.

59. The system of claim 49, wherein the host controller comprises logic to perform media access control in compliance with IEEE 802.3.

60. The system of claim 49, wherein the host controller comprises logic to perform optical transport network deframing in compliance with ITU-T G.709.

61. The system of claim 49, wherein the host controller comprises logic to perform forward error correction processing in compliance with ITU-T G.975.

62. The system of claim 49, further comprising a switch fabric coupled to the backplane interconnection.

63. The system of claim 49, further comprising a packet processor coupled to the backplane interconnection.

64. A system comprising:
   a security device to receive and transmit signals through a physical medium dependent device and to perform security related operations on received signals;
   an Ethernet controller to perform media access control operations in compliance with Ethernet and comprising an interface to provide communications with the security device;
   a host controller to receive and transmit signals with the Ethernet controller;
   a backplane interconnection to provide intercommunication at least among host controller and physical medium dependent device; and
   a switch fabric coupled to the backplane interconnection.

65. The system of claim 64, wherein the Ethernet controller comprises:
   the physical medium dependent device to perform optical-to-electrical signal conversion and electrical-to-optical signal conversion; and
   physical medium attachment to receive and provide signals with the physical medium dependent device and to perform media access control operations in compliance with Ethernet;
   a media access control device to receive and provide signals with the physical medium attachment and to perform media access control operations in compliance with Ethernet; and
   an extender sublayer to interconnect the security device with the media access control device and to provide communications between the media access control device and the security device.

66. The system of claim 64, wherein the interface comprises a XAUI compatible interface.

67. The system of claim 64, wherein the Ethernet controller selectively inserts a programmable byte space among packets.

68. The system of claim 67, wherein the programmable byte space is based upon an inter-computer connection.

69. The system of claim 67, wherein the programmable byte space is based upon pre-determined information concerning a destination computer.

70. The system of claim 64, wherein the Ethernet controller selectively slows down transmission of packets to the security device in response to receipt of a message to slow down transmission.

71. The system of claim 64, wherein the security device transmits the message to slow down to the Ethernet controller in response to packets transmitted from the Ethernet controller to the security device exceeding a specified rate.

72. The system of claim 64, wherein the Ethernet controller selectively transmits a message to the host controller in response to the Ethernet controller receiving packets at a rate approximately the same or higher than a predetermined threshold rate and wherein the message comprises a message to slow packet transmission to the Ethernet controller.

73. The system of claim 64, wherein the Ethernet controller selectively discards packets in response to packet receipt rate exceeding a predetermined threshold rate.

74. The system of claim 64, wherein the security device selectively discards packets in response to packet receipt rate exceeding a predetermined threshold rate.

75. The system of claim 64, wherein the host controller comprises logic to perform media access control in compliance with IEEE 802.3.

76. The system of claim 64, wherein the host controller comprises logic to perform optical transport network deframing in compliance with ITU-T G.709.

77. The system of claim 64, wherein the host controller comprises logic to perform forward error correction processing in compliance with ITU-T G.975.

78. The system of claim 64, further comprising a packet processor coupled to the backplane interconnection.

79. A method comprising:
   performing security related operations on received packets;
   receiving security processed packets using a XAUI compatible interface;
   performing media access control processing on received security processed packets;
   performing media access control processing on transmit packets;
   providing transmit packets for security processing using a XAUI compatible interface;
   performing security related operations on provided transmit packets; and
   selectively slowing down providing of packets for security processing in response to receipt of a message to slow down transmission,
   wherein the securing related operations are performed by a security device having an associated unique address.

80. The method of claim 79, further comprising selectively inserting a programmable byte space among packets.

81. The method of claim 80, wherein the programmable byte space is based upon an inter-computer connection.

82. The method of claim 80, wherein the programmable byte space is based upon pre-determined information concerning a destination computer.

83. The method of claim 79, further comprising transmitting a message to slow down transmission of received security processed packets in response to received security processed packets exceeding a specified rate.

84. The method of claim 79, further comprising transmitting a message from an Ethernet controller to a source of packets in response to the Ethernet controller receiving packets from the source at a rate approximately the same or higher than a predetermined threshold rate and wherein the message comprises a message to slow packet transmission to the Ethernet controller.

85. The method of claim 84, wherein the source comprises a host controller.

86. The method of claim 79, further comprising selectively discarding received security processed packets in response to packet receipt rate exceeding a predetermined threshold rate.

87. The method of claim 79, further comprising selectively discarding packets provided for security processing in response to packet receipt rate exceeding a predetermined threshold rate.

88. The method of claim 79, wherein packets communicate commands to the security device based on the address.

89. The method of claim 88, wherein the address comprises an IP address.

90. The method of claim 88, wherein the address comprises a MAC address.

\* \* \* \* \*